United States Patent
Cooley

(10) Patent No.: US 7,111,887 B2
(45) Date of Patent: Sep. 26, 2006

(54) ELEVATED MOVABLE CARGO TRAY FOR VEHICLE

(76) Inventor: Patrick S. Cooley, 236 N. 400 West, Peru, IN (US) 46970

( * ) Notice: Subject to any disclaimer, the term of this patent is extended or adjusted under 35 U.S.C. 154(b) by 0 days.

(21) Appl. No.: 11/343,015

(22) Filed: Jan. 30, 2006

(65) Prior Publication Data
US 2006/0170234 A1 Aug. 3, 2006

Related U.S. Application Data

(60) Provisional application No. 60/648,864, filed on Feb. 1, 2005.

(51) Int. Cl.
*B60R 11/06* (2006.01)
(52) U.S. Cl. .................... 296/37.6; 296/26.09
(58) Field of Classification Search .............. 296/24.3, 296/24.44, 26.09, 184.1, 37.6; 248/300; 414/522; 224/403, 404, 542, 554
See application file for complete search history.

(56) References Cited

U.S. PATENT DOCUMENTS

| | | | |
|---|---|---|---|
| 3,338,620 A * | 8/1967 | Cauvin | 296/37.14 |
| 4,824,158 A * | 4/1989 | Peters et al. | 296/37.6 |
| 4,887,526 A | 12/1989 | Blatt | |
| 4,993,088 A | 2/1991 | Chudik | |
| 5,988,722 A * | 11/1999 | Parri | 296/26.09 |
| 6,283,526 B1 * | 9/2001 | Keough et al. | 296/26.09 |
| 6,328,364 B1 * | 12/2001 | Darbishire | 296/26.09 |
| 6,390,525 B1 | 5/2002 | Carpenter et al. | |
| 6,491,331 B1 * | 12/2002 | Fox | 296/26.09 |
| 6,659,524 B1 | 12/2003 | Carlson | |
| 6,860,536 B1 * | 3/2005 | Schimunek | 296/26.09 |
| 6,866,316 B1 * | 3/2005 | Harder et al. | 296/26.09 |
| 6,942,269 B1 * | 9/2005 | Mains | 296/37.16 |
| 2002/0140245 A1 * | 10/2002 | Coleman et al. | 296/26.09 |
| 2002/0180231 A1 * | 12/2002 | Fox | 296/26.01 |
| 2003/0111860 A1 * | 6/2003 | Voves | 296/37.6 |
| 2005/0212317 A1 * | 9/2005 | Kobylski et al. | 296/26.09 |
| 2005/0285422 A1 * | 12/2005 | Bartos et al. | 296/26.09 |
| 2006/0091689 A1 * | 5/2006 | Wilding | 296/37.6 |

* cited by examiner

*Primary Examiner*—Jason Morrow
(74) *Attorney, Agent, or Firm*—Frank D Lachenmaier

(57) ABSTRACT

This invention relates generally to an easy to install and remove, elevated, lockable, retractable cargo tray for pickup trucks, vans, sport utility vehicles and other service type vehicles that leaves the floor of the storage area clear for large or heavy tools while providing an accessible storage tray for tools or other often used supplies.

3 Claims, 6 Drawing Sheets

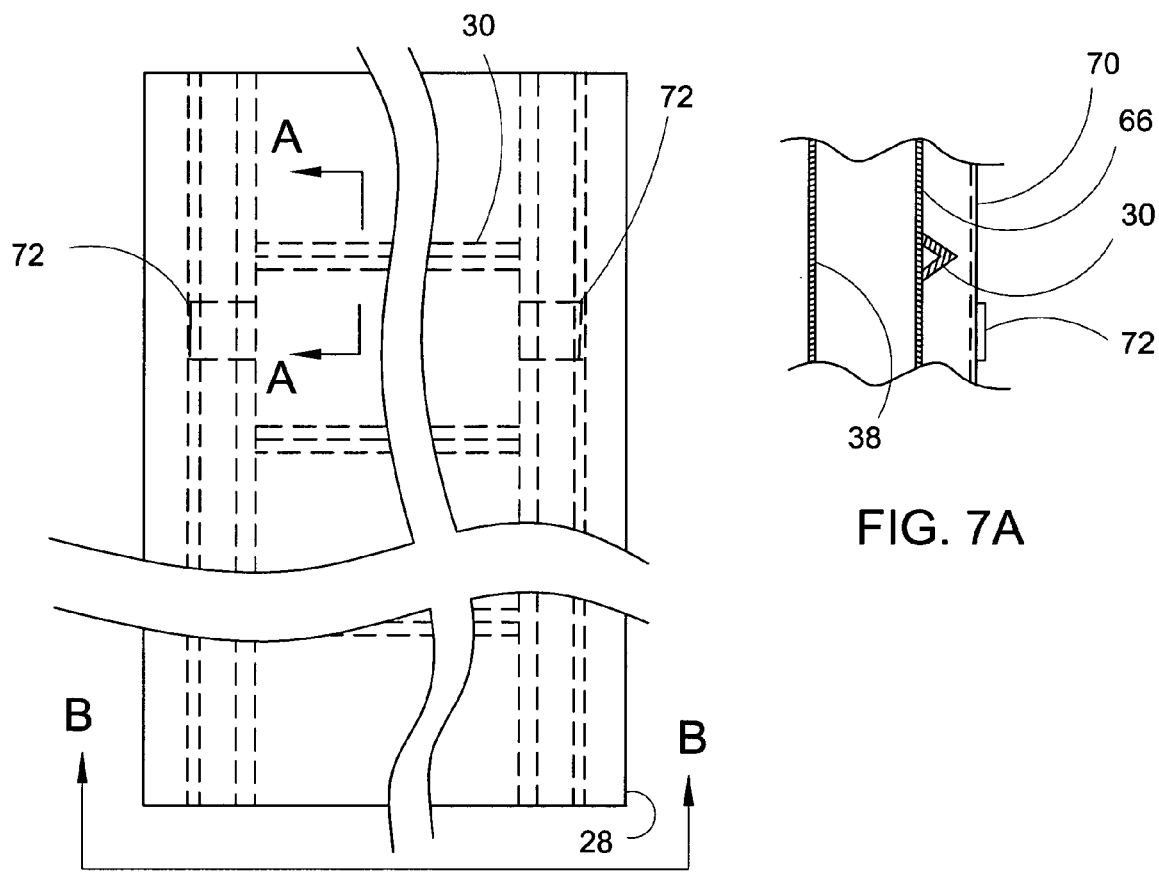
FIG. 7
FIG. 7A
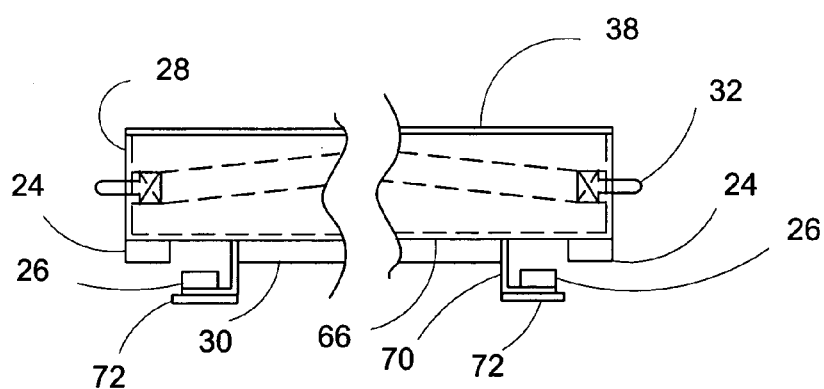
FIG. 7 B

150# ELEVATED MOVABLE CARGO TRAY FOR VEHICLE

FIELD OF INVENTION

This invention relates generally to an elevated, lockable, retractable cargo tray for pickup trucks, vans, sport utility vehicles and other service type vehicles.

1. Background of Invention

Vehicles that are used for used for transporting tools and materials for certain tasks have a significant drawback, particularly when they are enclosed, as with a pickup truck topper. Articles loaded to the front of the vehicle become almost inaccessible when large items are loaded behind them. There are a number of bed slides or sliders on the market that address this problem by allowing a movable floor to retract out of the bed of the vehicle, allowing access to the front portion of the bed slide. A significant problem that this slider bed type solution does not address is that, often the full floor of the bed is needed to haul materials such studs or 4×8 sheeting. The driver then must resort to the inconvenient and perhaps unsafe practice of packing his other tools and equipment in the cab of his vehicle or unloading them, loading the large flat-surface materials and then reloading his portable tools on top of them, and reversing this cumbersome process at the job site.

2. Prior Art

U.S. Pat. No. 6,390,525 to Carpenter et al. discloses a bottom frame to attach to the floor of a vehicle storage area and a top portion slidably connected to the frame.

U.S. Pat. No. 4,993,088 to Chudik 1991 shows a similar slider bed but includes a fold down table leg for support of the top frame when fully extended over an opened tailgate.

One of the other significant problems with the typical slider beds, particularly when the slider portion is heavily loaded is the need for a very solid locking system to prevent the mass from sliding forward in a collision or sliding out the back when parking on a steep incline. U.S. Pat. No. 6,659,524 to Carlson 2003 addresses this problem with a series of equally spaced latch mechanisms mounted on the bottom frame with a downwardly angled latch mounted to the moving frame which can be rotated upward to release the bed for movement.

SUMMARY OF INVENTION

An object of the present invention is to provide a slider bed type cargo area that allows easy access to the front of a storage area without having to unload the floor area of the bed or physically climb up into the bed of the vehicle every time you need a tool or part from the front of the storage area.

Another object of the present invention is to provide a slider bed type cargo area that is elevated above the floor of the vehicle, mounted to the sides of the storage area, thus giving full floor access for studs, sheets or the like while providing a movable, lockable storage area for tools in the elevated tray.

A further object is to provide a slider bed type cargo area that is easy to install and remove.

A further object is to provide a slider bed type cargo area that is lightweight, yet durable with a smooth sliding action.

A further object is to provide a slider bed type cargo area that is position lockable to prevent unintended motion during sudden stops or when parked on severe inclines and secured from bouncing off the slider rail when driving over rough terrain.

A further object is to provide a slider bed type cargo area tray with a top that is water tight and lockable for protecting and securing valuable tools on a job site.

The present invention, in its several embodiments, meets the above mentioned objectives.

Still further objects and advantages will become apparent from a consideration of the ensuing description and accompanying drawings. In the description, reference is made to the accompanying drawings that form a part thereof. A specific embodiment in which the invention may be practiced is shown by way of illustration. This embodiment will be described in sufficient detail to enable those skilled in the art to practice this invention, and be understood that other embodiments may be utilized and that structural changes may be made without departing from the scope of the invention. In the accompanying drawings, like reference characters designate the same or similar parts throughout the several views.

DRAWINGS

In order that the invention may be more fully understood it will now be described by way of example, with reference to the accompanying exemplary drawings in which:

FIG. 3A is a back view of frame assembly.

FIG. 7 is a broken top view of the cargo tray showing the cargo tray reinforcement ribs on the under side of the tray running between the bottom slider mechanism brackets.

FIG. 7A is s section view through one of the cargo tray reinforcement ribs.

FIG. 7B is a rear view of the cargo tray showing the top and bottom slider mechanism locations.

REFERENCE NUMERALS

Figure 1:
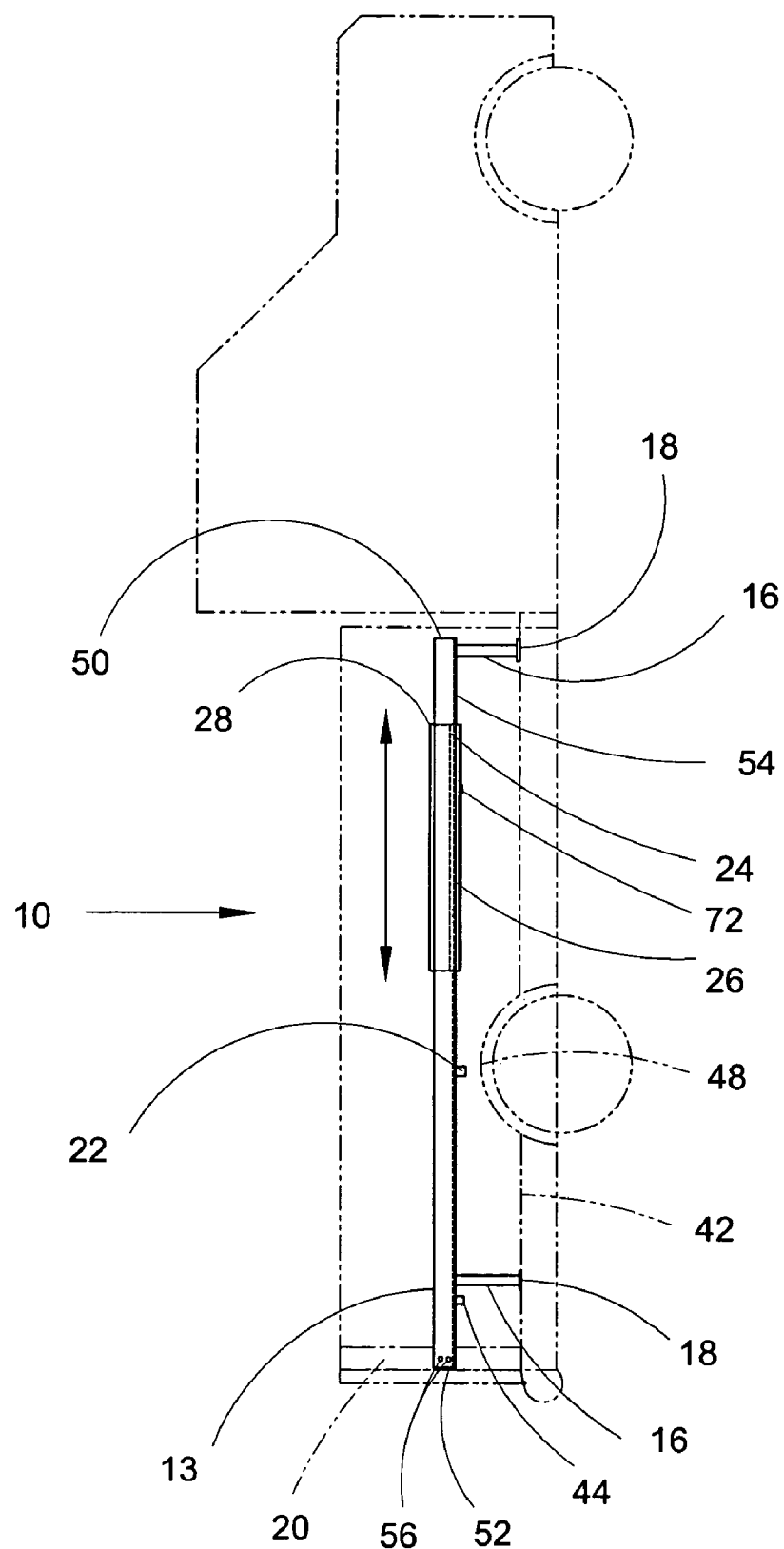
FIG. 1 is a partial cut away side view of a cargo tray assembly installed in a pickup truck.

The same reference numbers are used to refer to the same or similar parts in the various views.

10 - a cargo tray assembly
12 - left side rail
13 - right side rail

-continued

14 - cross brace
16 - support legs
18 - mounting plate
20 - vertical support post on truck bed wall
22 - middle support bracket
24 - top slider mechanism
26 - bottom slider mechanism
28 - cargo tray
30 - cargo tray reinforcement ribs
32 - cargo tray location latch pin
34 - latch bars
36 - latch release
38 - cargo tray cover
40 - cargo tray cover lock
42 - floor of storage area
44 - cargo tray stop plate
46 - side wall of storage area
48 - top of fender well
50 - side rail first end
52 - side rail second end
54 - side rail bottom side
56 - second end mounting holes
58 - locator holes
60 - side rail vertical wall
62 - side rail horizontal wall
64 - side rail horizontal wall upper surface
66 - bottom surface of bottom plate of cargo tray
68 - angle bracket top surface
70 - angle brackets
72 - side rail stop

DETAILED DESCRIPTION

Cargo tray assembly 10 will now be described, by way of example, with reference to the accompanying drawings. FIGS. 1 through 7B illustrate a preferred embodiment of cargo tray assembly 10 wherein a front-to-rear-position slideable, lockable, and elevated cargo tray that is easy to install and remove is disclosed.

Figure 2:
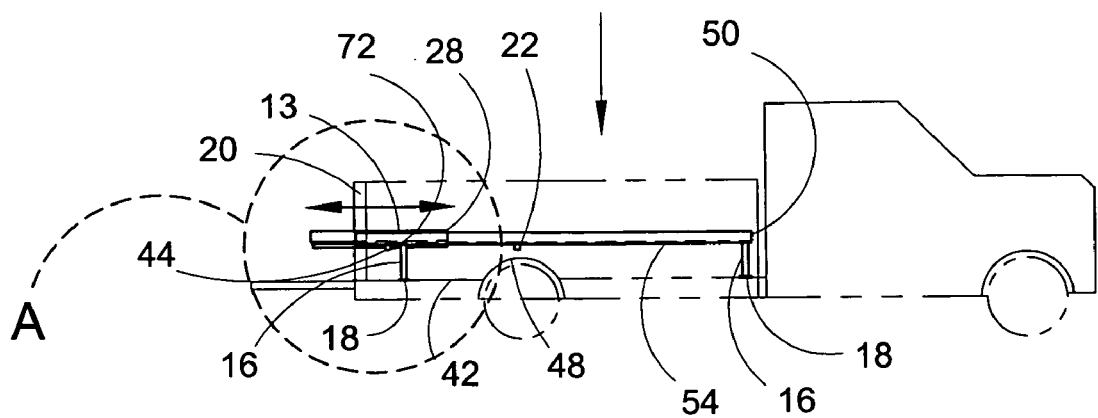
FIG. 2 is a partial cut away side view of a cargo tray assembly installed in a pickup truck with the tailgate down and the cargo tray rearmost extended.
Figure 2A:
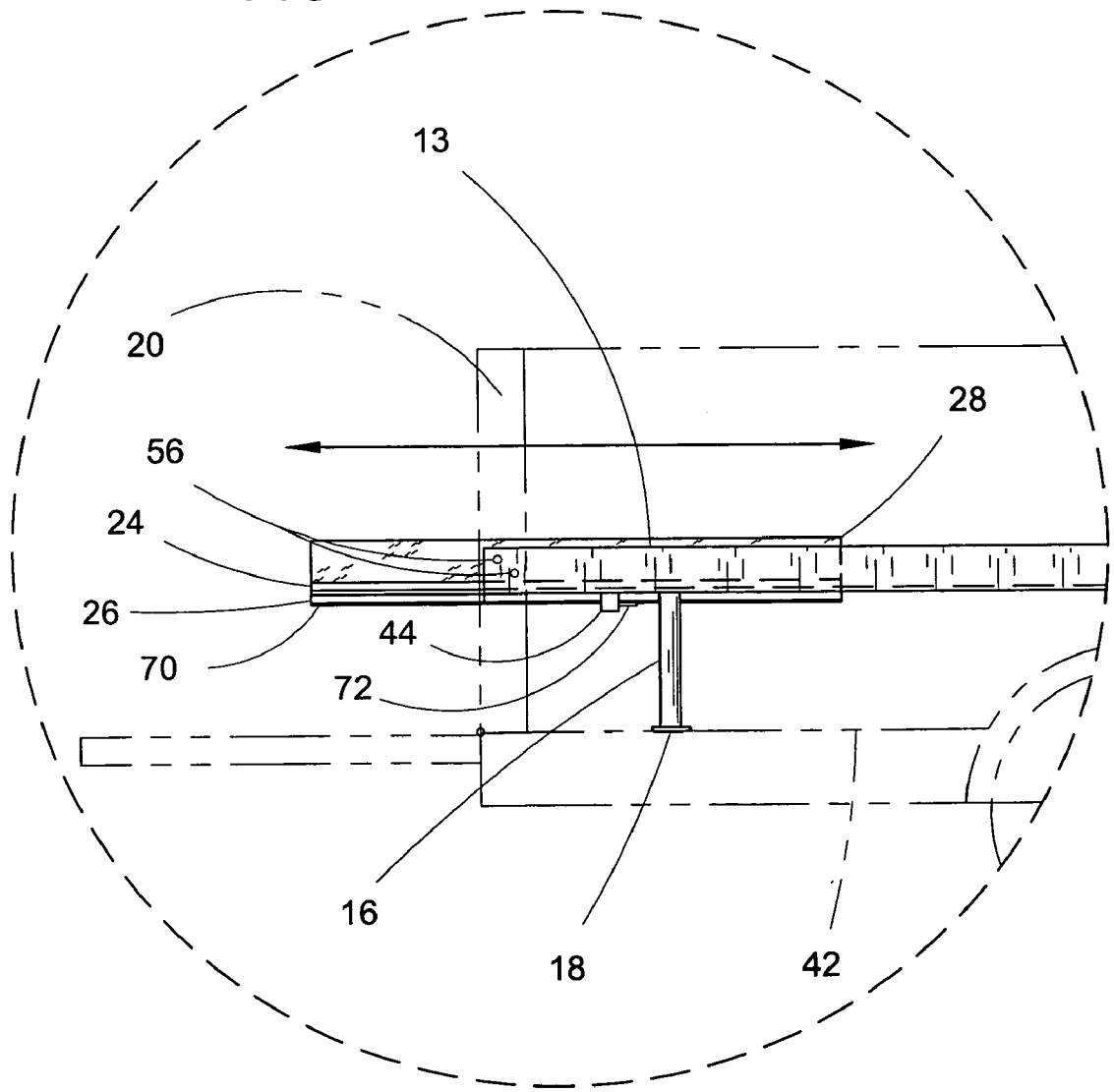
FIG. 2A is an enlarged partial view of the cargo tray extended.

Turning to FIG. 1, therein is shown a cut away side view of cargo tray assembly 10 mounted in a typical internal fender pickup truck bed that is shown in phantom lines and not a part of this invention. FIG. 2 shows a reduced view similar to FIG. 1 except the tailgate of the pickup truck is down and cargo tray 28 is shown in its rearmost position, cantilevered out of the bed approximately 12 inches. FIG. 2A is an enlarged partial view of cargo tray 28 in its cantilevered position.

Figure 3:
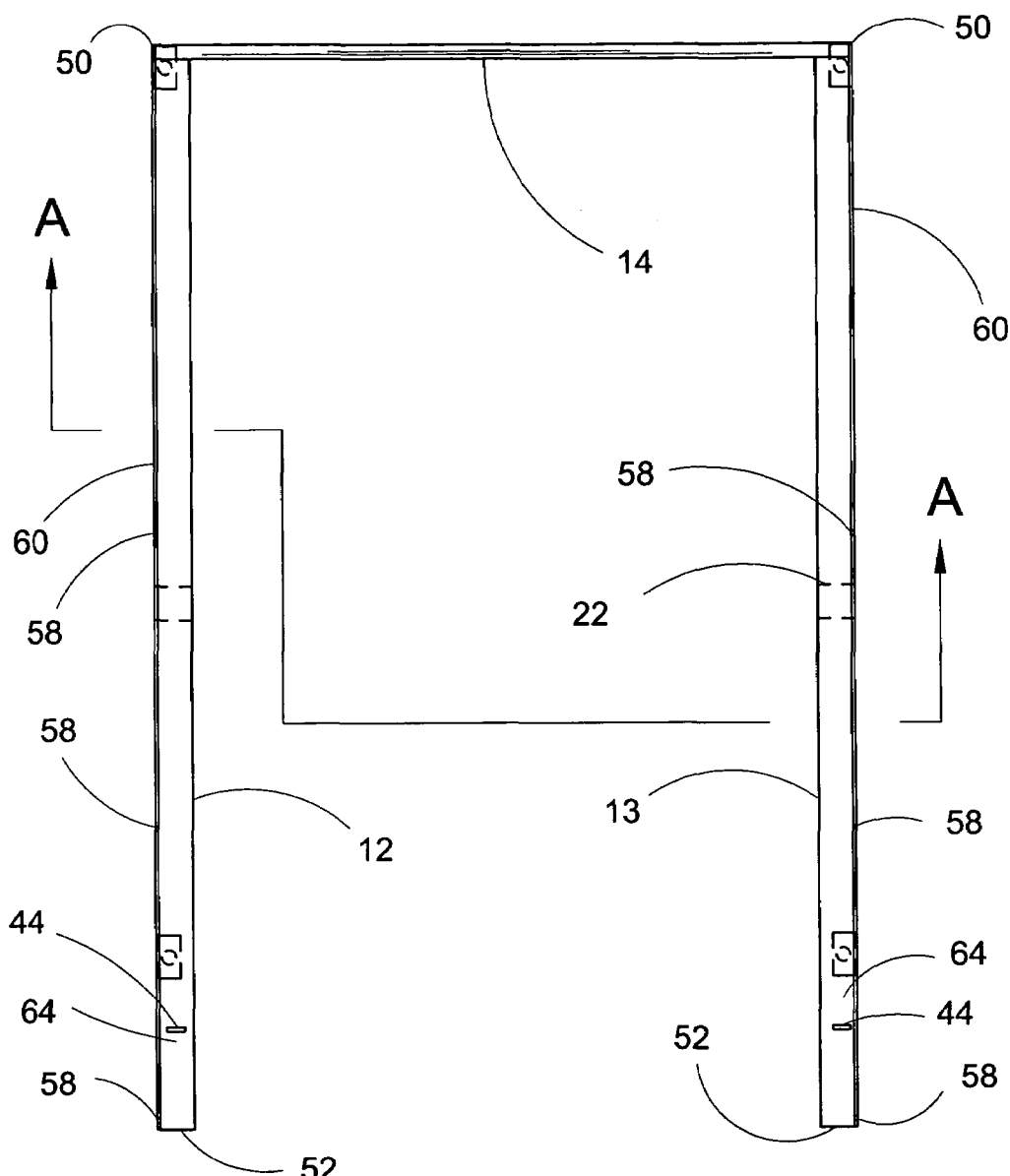
FIG. 3 is a top view of a frame assembly.
Figure 3:
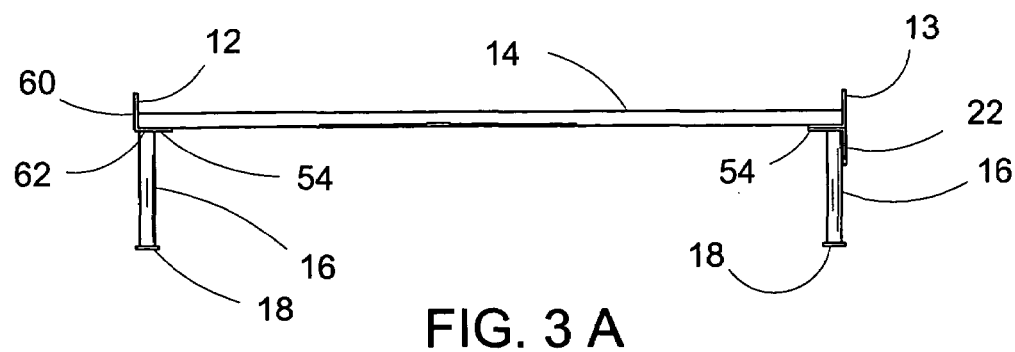

An elevated stationary frame assembly is shown in FIGS. 3 and 3A, comprised of L-shaped opposing left and right side rails 12 and 13 respectively that have first ends 50, second ends 52, vertical walls 60, horizontal walls 62 that have upper surfaces 64, and bottom sides 54. Opposing side rails 12 and 13 are open to the top and middle of the assembly and are spaced apart by cross brace 14 at their first ends 50 as shown in FIG. 3. Cross brace 14 is preferably made from 1¼ inch diameter aluminum pipe. FIG. 3A shows opposing rails 12 and 13 each supported by two legs 16 that are approximately 10 inches long and preferably made from 1¼ inch diameter, aluminum tubing. Legs 16 are suspended from bottom side 54 of side rails 12 and 13 and are attached at the bottom to mounting plates 18, preferably made from approximately 2 inch by 3¾ inch plates with mounting holes to secure mounting plates 18 to floor of storage area 42. The centerline of legs 16 are approximately 2 inches back from first ends 50 and approximately 15³⁄₁₆ inches forward from second ends 52. Opposing side rails 12 and 13 are preferably made from 3 inch×3 inch×¼ inch aluminum angle stock in varying lengths to fit the intended vehicle. Opposing side rails 12 and 13 are supported directly above top of fender well 48 by middle support brackets 22 which are preferably simple L-shaped brackets attached to side rail bottom side 54 and fastened to side wall of storage area 46 with conventional fasteners. Side rail second ends 52 are attached to vertical support posts 20 on side wall of storage area 46 using conventional fasteners through clearance holes 56 in side rails 12 and 13.

A plurality of cargo tray locator holes 58 are positioned in vertical walls 60 of opposing side rails 12 and 13 such that cargo tray 28 can be locked in the foremost position, locked in its rearmost position, overhanging side rail second ends 52 by approximately 12 inches and at multiple points in between.

Figure 4A:
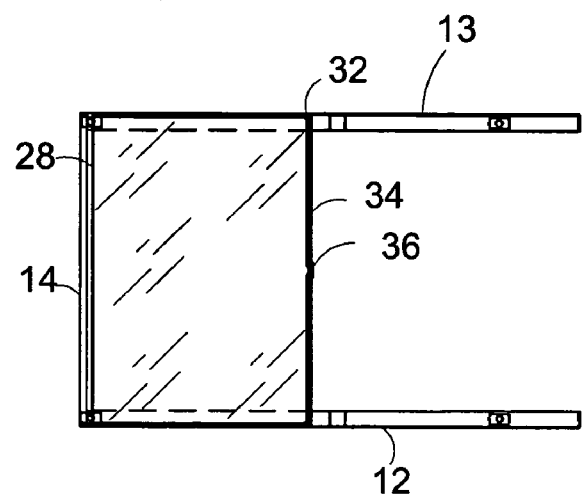
FIG. 4A is a top view showing a cargo tray slidably disposed in a frame assembly in the foremost position.
Figure 4B:
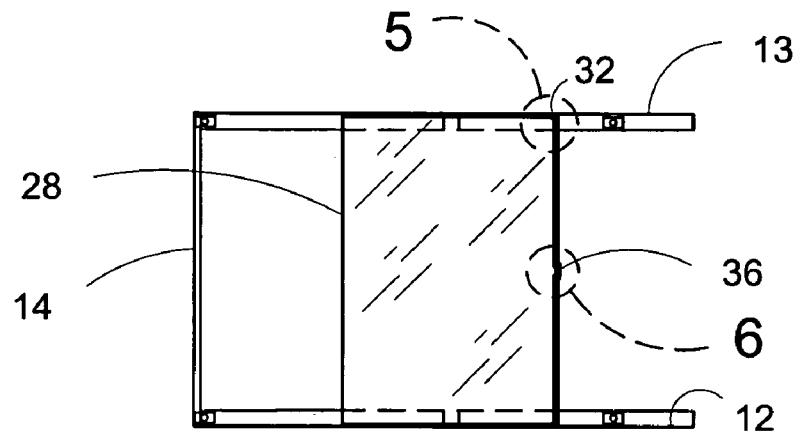
FIG. 4B is a similar view showing the cargo tray in a mid-position.
Figure 4C:
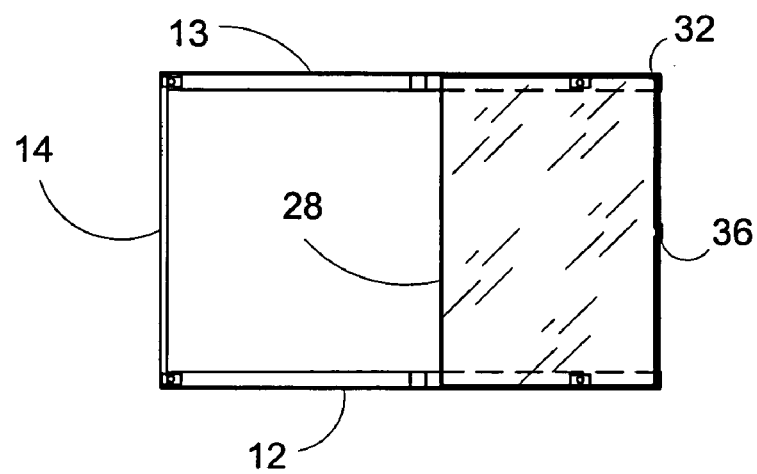
FIG. 4C is a similar view showing a cargo tray in its rearmost position without cantilevering the tailgate.

FIG. 4A shows a top view of elevated cargo tray assembly slideably mounted in-between opposing side rails 12 and 13 in its foremost position. FIG. 4B shows the cargo tray assembly at a mid-point and highlights areas 5 and 6 which will show as enlarged views on sheet 5. FIG. 4C shows it at the rearmost position without cantilevering off second ends 52 of opposing side rails 12 and 13. It is comprised of cargo tray 28 that is preferably formed of an approximately 60 inch×42 inch×³⁄₁₆ inch thick aluminum plate bottom with approximately 3½ inch high side walls of diamond plate aluminum sheeting. A plurality of cargo tray bottom reinforcing ribs 30 are equally spaced and welded to bottom surface of the bottom plate 66 and to the backs of angle brackets 70 as shown in FIGS. 7 and 7A and are preferably fabricated from ⅜ inch×⅜ inch×³⁄₁₆ inch thick aluminum angle bars.

Figure 5:
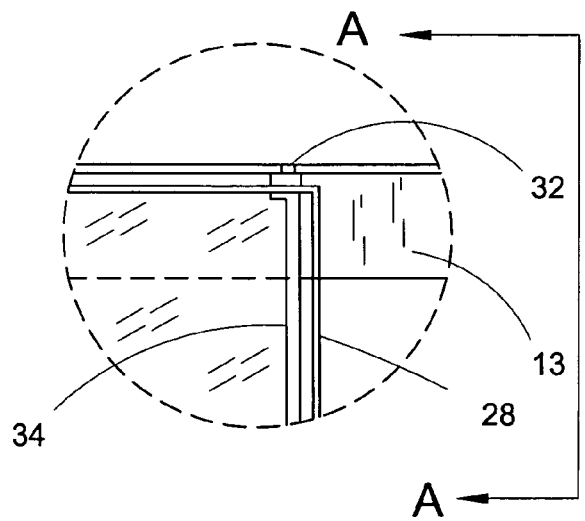
FIG. 5 is an enlarged partial top view of the right rear corner of cargo tray and the locator pin entered into side rail locating hole.
Figure 5A:
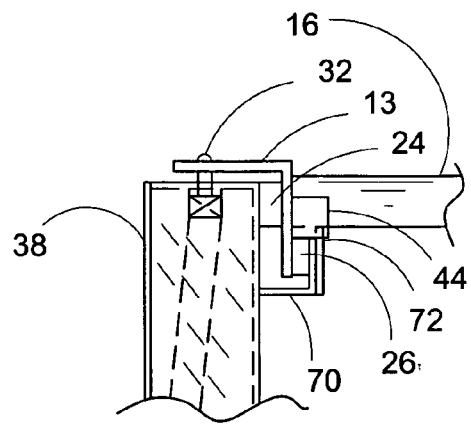
FIG. 5A is an end view of the partial view shown in FIG. 5 showing top and bottom slider mechanism locations.

FIG. 5 is a top view of the rear right hand corner of cargo tray 28 disposed on side rail upper surface 64, showing latch bars 34 connected to cargo tray locater pins 32. FIG. 5A partial end view through right side rail 13 showing top slider mechanisms 24 attached to bottom surface of the bottom plate 66 of cargo tray 28, directly over side rail horizontal wall upper surfaces 64. FIG. 5 also shows bottom slider mechanisms 26 mounted on the top surface 68 of angle brackets 70. These angle brackets are preferably made from ¾ inch×¾ inch aluminum angle, suspended from bottom surface of bottom plate 66 running from front to back of cargo tray 28 such that they clear the inside edge of opposing side rails 12 and 13. Cargo tray stop plate 72 is a metal plate fastened under angle brackets 70, approximately 14 inches from side rail first ends 50, extending outward a sufficient distance as to impinge on side rail stop 44 which is attached to side rail bottom sides 54 at a point that stops cargo tray 28 from extending more than the predicted amount past second ends 52 of opposing side rails 12 and 13. Bottom slider mechanisms 26 prevent cargo tray 28 from disengaging from side rails 12 and 13 during abrupt stops or when traversing rough terrain.

Figure 6A:
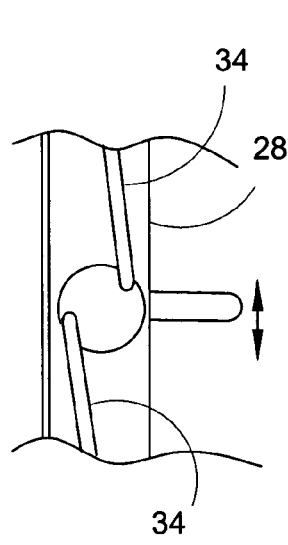
FIG. 6A is an inside view of latch bars and release mechanism.
Figure 6:
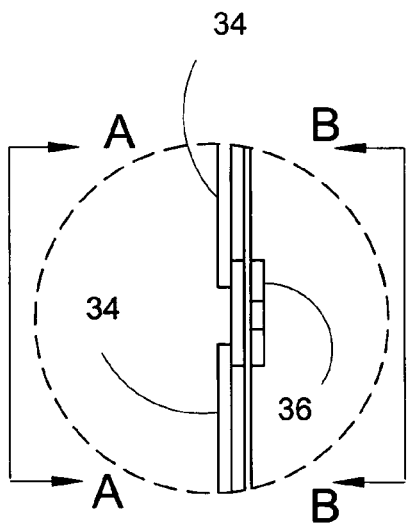
FIG. 6 is an enlarged top view of latch bars and release mechanism.
Figure 6B:
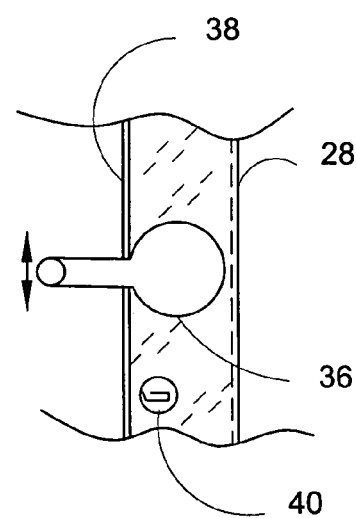
FIG. 6B is an end view of latch release mechanism.

FIGS. 6, 6A and 6B disclose a preferred position latch system for cargo tray 28. A plurality of cargo tray position locator holes 58 are placed in the vertical walls of opposing side rails 12 and 13. Cargo tray location latch pins 32 are mounted in the rear of the sidewalls of cargo tray 28 and are biased into the position locator holes by spring loaded latch bars 34 that run from the back of both location latch pins 32 to latch release 36. When latch release 36 is activated it retracts latch pins 32 from locator holes 58, allowing cargo tray 28 to be relocated and latched in its new position.

FIG. 6B also shows cargo tray cover 38 with its cargo tray cover lock 40.

FIG. 7 is a top view of cargo tray 28 showing in dashed lines the cargo tray reinforcement ribs 30. Depending on the materials selected for cargo tray 28 more or less ribs will be utilized. FIG. 7A is a partial section through one of cargo tray reinforcing ribs 30 and shows it to be an aluminum angle welded to bottom surface 66 running between and welded to the inside wall of angle brackets 70. FIG. 7B is a broken end view of cargo tray assembly disposed on stationary elevated frame assembly.

The preferred embodiment herein described is illustrative of a BED MAX embodiment for relatively light weight applications, thus accounting for the material of preference selection of aluminum. For other applications, various components would preferably be selected from cold rolled steel, stainless steel, wood or high strength engineering grade plastics based on the anticipated mass and shape of work loads. While this invention has been described with reference to an illustrative embodiment, it will be understood that this description is not limiting as to size, scale or construction materials. Rather, the scope of this invention is covered by the following claims.

What is claimed is:

1. An elevated, moveable cargo tray for sport utility vehicles, pickup trucks, vans and utility vehicles that have cargo storage areas with a front, a back, a floor and sidewalls, comprising:
   a stationary frame assembly comprising:
   a) L-shaped, longitudinally extending, left and right opposing side rails with a first end, a second end, a vertical wall and a horizontal wall where said horizontal wall has a top surface and a bottom surface and said horizontal surfaces extend inward from said vertical walls;
   b) a cross brace attached between said first ends of said opposing side rails laterally spacing said opposing side rails apart;
   c) support legs suspended from said bottom surface of said side rails toward said first end and said second end of said side rails, elevating said side rails above said storage area floor with mounting plates attached at the feet of said support;
   d) middle support brackets suspended from said bottom surface of said side rails at the approximate middle of said opposing side rails;
   e) clearance holes in said vertical wall of said second end of said side rails;
   f) a plurality of coaxial locator holes in said vertical walls of opposing side rails equidistant from said first ends of said left and right side rails;
   a movable cargo tray assembly comprising:
   a) a cargo tray having front, back and side walls, a bottom surface and a lockable, sealable cover;
   b) said movable cargo tray being slidably received between said left and right opposing side rails;
   c) upper slider mechanisms attached to said bottom surface of said movable cargo tray whereby said moving cargo tray slides smoothly along said top surface of horizontal wall of said side rails on said slider mechanisms;
   d) angle brackets having vertical walls depending from said bottom surface of said cargo tray and an outward facing horizontal walls with a top surface located far enough below said bottom surface of said horizontal wall of said opposing side rails to allow bottom slider mechanisms to be attached to said top surface of said horizontal wall of said angle brackets and to allow said cargo tray to run smoothly along said bottom surface of said horizontal wall of said opposing side rails, trapping said horizontal surface of said side rail between said top and bottom slider mechanisms whereby said cargo tray will not disengage from said side rails;
   e) cargo tray location latch pins located at the rear of said cargo tray side walls concentric with said plurality of coaxial locator holes in said opposing side rails vertical walls, biased outward, forcing engagement of said pins into said coaxial locator holes when properly aligned; and
   f) said latch pins are connected by latch bars to a latch release mechanism in the center of said back wall of said cargo tray whereby when activated said latch pins are retracted and said cargo tray released allowing it to be moved to a new location,
   whereby said floor of said storage area is left available for hauling of temporary cargo while routinely used tools and supplies are stored in an elevated, movable for easy access, and lockable tray.

2. An elevated, movable cargo tray for sport utility vehicles, pickup trucks, vans and utility vehicles with a storage area comprised of a front wall, floor and sidewalls, as in claim 1 where slider mechanisms are selected from a group comprising: slider strips made from lubricious plastic material, castor ball in recessed enclosure and rolling wheels on axles.

3. An elevated, movable cargo tray for sport utility vehicles, pickup trucks, vans and utility vehicles with a storage area comprised of a front wall, floor and sidewalls, as in claim 1 where said stationary frame is easily installed by fastening said mounting plates to said floor of storage area, said middle support brackets to said side walls of storage area and said vertical walls of said second ends of side rails to vertical support posts that are attached to the rear of said storage side walls, using conventional fasteners; where said cargo tray assembly is slid into place from the rear of said frame assembly wherein said horizontal walls of said right and left rails engage between said top and bottom slider mechanism and said locator pins are biased into one of the sets of coaxial locator holes in said side rail vertical surfaces.

* * * * *